(12) United States Patent
Zhou et al.

(10) Patent No.: US 8,803,880 B2
(45) Date of Patent: Aug. 12, 2014

(54) IMAGE-BASED LIGHTING SIMULATION FOR OBJECTS

(75) Inventors: Bingfeng Zhou, Beijing (CN); Jie Feng, Beijing (CN)

(73) Assignee: Peking University, Beijing (CN)

( * ) Notice: Subject to any disclaimer, the term of this patent is extended or adjusted under 35 U.S.C. 154(b) by 606 days.

(21) Appl. No.: 12/545,420

(22) Filed: Aug. 21, 2009

(65) Prior Publication Data

US 2011/0043522 A1 Feb. 24, 2011

(51) Int. Cl.
*G06T 15/50* (2011.01)
*G09G 5/02* (2006.01)
*G09G 5/00* (2006.01)

(52) U.S. Cl.
USPC ............................ 345/426; 345/632; 345/589

(58) Field of Classification Search
USPC .............................................. 345/426, 32, 34
See application file for complete search history.

(56) References Cited

U.S. PATENT DOCUMENTS

| | | | | |
|---|---|---|---|---|
| 6,628,298 | B1 * | 9/2003 | Debevec ........................ | 345/632 |
| 6,685,326 | B2 * | 2/2004 | Debevec et al. ................ | 362/11 |
| 7,010,158 | B2 * | 3/2006 | Cahill et al. ................... | 382/154 |
| 7,106,325 | B2 | 9/2006 | Ritter et al. | |
| 7,177,026 | B2 | 2/2007 | Perlin | |
| 7,200,262 | B2 * | 4/2007 | Sawada ......................... | 382/154 |

OTHER PUBLICATIONS

Paul Debevec. 1998. Rendering synthetic objects into real scenes: bridging traditional and image-based graphics with global illumination and high dynamic range photography. In Proceedings of the 25th annual conference on Computer graphics and interactive techniques (SIGGRAPH '98). ACM, New York, NY, USA, 189-198.*

Paul E. Debevec and Jitendra Malik. 1997. Recovering high dynamic range radiance maps from photographs. In Proceedings of the 24th annual conference on Computer graphics and interactive techniques (SIGGRAPH '97). ACM Press/Addison-Wesley Publishing Co., New York, NY, USA, 369-378.*

Petrik Clarberg, Wojciech Jarosz, Tomas Akenine-M\&\#246;ller, and Henrik Wann Jensen. 2005. Wavelet importance sampling: efficiently evaluating products of complex functions. ACM Trans. Graph. 24, 3 (Jul. 2005), 1166-1175.*

Wang, Rui, et al., All-Frequency Relighting of Non-Diffuse Objects Using Separable BRDF Approximation, Proceedings of 15$^{th}$ Eurographics Symposium on Rendering (2004).

Cole, Forrester Hardenbergh, Automatic BRDF Factorization, Apr. 8, 2002, pp. 1-53.

Claustres, Luc, et al., Wavelet Encoding of BRDFs for Real-Time Rendering, IRIT—University of Toulouse, France, 2007.

An, W., and Zhou, B., "Hardware accelerated approach for accurate surface splatting," Journal of Computational Information Systems(the Workshop Proceedings of Edutainment), 2006, vol. 2, Issue: 2, pp. 567-574.

(Continued)

*Primary Examiner* — Kee M Tung
*Assistant Examiner* — Zhengxi Liu
(74) *Attorney, Agent, or Firm* — Brundidge & Stanger, P.C.

(57) ABSTRACT

This disclosure relates to simulating the light-reflective condition of an object when situated in a given environment. A spatial irradiance mapping of the environment may be obtained, from which a series of directional incidence light sources are determined. The reflective qualities of the object may be modeled as a bi-directional reflection distribution function to be applied to directional incidence light sources. The spatial irradiance mapping and/or bi-directional reflection distribution function may be obtained according to image-based techniques.

16 Claims, 9 Drawing Sheets

(56) References Cited

OTHER PUBLICATIONS

An, W., and Zhou, B., "Spherical panoramic mosaics with the image division and warping methods," The Proceedings of 30th International Congress of Imaging Science, 2006.

Boivin, S., and Gagalowicz, A., "Image-Based Rendering of Diffuse, Specular and Glossy Surfaces from a Single Image," Proceedings of the 28th annual conference on Computer graphics and interactive techniques, 2001, pp. 107-116.

Debevec, P., "Image-based lighting," IEEE Computer Graphics and Applications, 2002, vol. 22, Issue: 2, pp. 26-34.

Debevec, P., et al., "Acquiring the reflectance field of a human face," In the Proceedings of the SIGGRAPH, 2000, pp. 145-156.

Dunbar, D., and Humphreys, G., "A spatial data structure for fast Poisson-disk sample generation," ACM Transactions on Graphics, 2006, vol. 25, Issue: 3, pp. 503-508.

Humphrey, M. C., "Efficient Computation of Voronoi Diagrams," Technical Report, pp. 13.

Marschner, S. R., et al., "Image-Based BRDF Measurement Including Human Skin," In Proc. Euro- graphics Workshop on Rendering, 1999, pp. 139-152.

Marschner, S., "Image-based bidirectional reflectance distribution function measurement," Applied Optics, 2000, vol. 39, Issue: 16, pp. 2592-2600.

Mattison, P., et al., "The Hand-Held Directional Reflectometer: an angular imaging device to measure BRDF and HDR in real time," Proceedings of SPIE, The International Society for Optical Engineering, , Jul. 1998, vol. 3426, pp. 240-251.

Matusik, W., et al., "Image-based 3D photography using opacity hulls," In the proceedings of the SIGGRAPH'02, 2002, pp. 427-437.

Rusinkiewicz, S. M., "A New Change of Variables for Efficient BRDF Representation," In the Proceedings of Eurographics Rendering Workshop, 1998, vol. 98, pp. 11-22.

Sato, Y., et al., "Object Shape and Reflectance Modeling from Observation," Proceedings of the 24th annual conference on Computer graphics and interactive techniques SIGGRAPH, 1997, vol. 31, pp. 379-387.

Szeliski, R., and Shum, H.-Y., "Creating Full View Panoramic Image Mosaics and Environment Maps," In Proceedings of the SIGGRAPH'97, Aug. 1997, pp. 251-258.

Ward, G. J., "Measuring and Modeling Anisotropic Reflection," ACM SIGGRAPH Computer Graphics, 1992, vol. 26, Issue: 2, pp. 265-272.

Y. Yu, et al., "Inverse Global Illumination: Recovering Reflectance Models of Real Scenes from Photographs," In the Proceedings of the SIGGRAPH, 1999, vol. 33, pp. 215-224.

Fu, Y., and Zhou, B., "Direct Sampling on Surface for High Quality Remeshing," Proceedings of the 2008 ACM Symposium on Solid and Physical Modeling, pp. 115-124.

\* cited by examiner

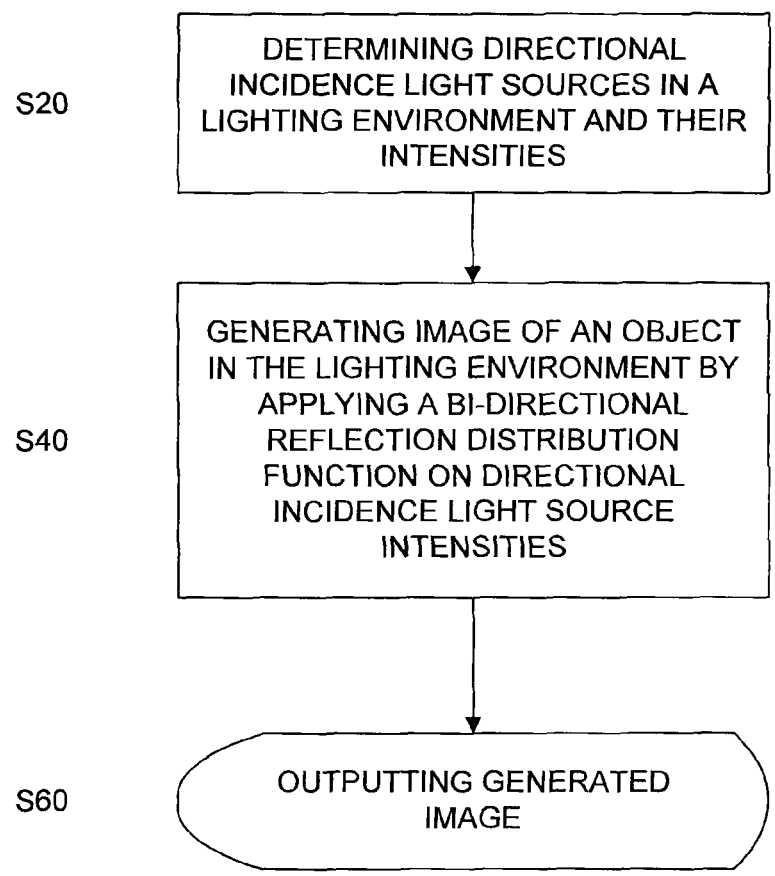

IMAGE-BASED LIGHTING SIMULATION FOR OBJECTS

BACKGROUND

Computer applications utilize image-based lighting techniques to simulate the illumination of real or virtual objects in computer images. One of the key goals of image-based lighting is to achieve a seamlessly harmonious visual integration between objects and the real environments. Image-based lighting techniques are relied upon in computer applications used by industries such as architecture, travel, gaming, aviation, and medicine. The typical research focuses include the digital landscape of cities, virtual museums and 3D special effects for movies, which highlight the fantastic shining features and require the lighting results be accurately and flexibly controllable.

Existing image-based lighting techniques relies not only on measuring the reflectance properties of the objects to be inserted in a computer image, but also modeling the illumination conditions of the environment in which the object is to be placed. Realistically modeling the surrounding illumination condition helps achieve realistic rendering of the object. It helps provide a consistent look between the object and the environment, and also influences the accuracy of further rendering computations in the computer image.

SUMMARY

A method is described in the present disclosure which includes determining by the at least one computer processor, a set of directional incidence light sources with respect to a given point of a lighting environment, the directional incidence light sources associated with respective intensities; generating by the at least one computer processor, an image of the object situated at the given point in the lighting environment from a particular viewing direction by applying a bi-directional reflection distribution function of the object on the intensities of the directional incidence light sources; and outputting the generated image.

The present disclosure further describes a method which includes obtaining a series of images of an object captured from a respective one of a plurality of camera shooting directions, wherein the direction of a primary light source on the object is varied in the series of images, calculating by the at least one computer processor, a bi-directional reflection distribution function of the object based on the obtained images of the object; generating by the at least one computer processor, an image representing the object situated at a given point in a lighting environment from a particular viewing direction by applying the bi-directional reflection distribution function of the object on intensities of directional incidence light sources in the lighting environment; and outputting the generated image.

The present disclosure further described an apparatus which includes at least one computer processor programmed to determine a set of directional incidence light sources with respect to a given point of a lighting environment, the directional incidence light sources associated with respective intensities, generate an image representing the object situated at the given point in the lighting environment from a particular viewing direction by applying a bi-directional reflection distribution function of the object on the intensities of the directional incidence light sources; and a device configured to output the generated image.

According to the present disclosure, the aforementioned methods, or any part thereof, may be performed by a computing device under the direction of a computer program embodied on a computer readable medium.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are farther described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 2A-2E are flow diagrams illustrating a method for generating an image simulating the reflective condition of an object in a lighting environment, according to an example embodiment;

DETAILED DESCRIPTION

Figure 1:
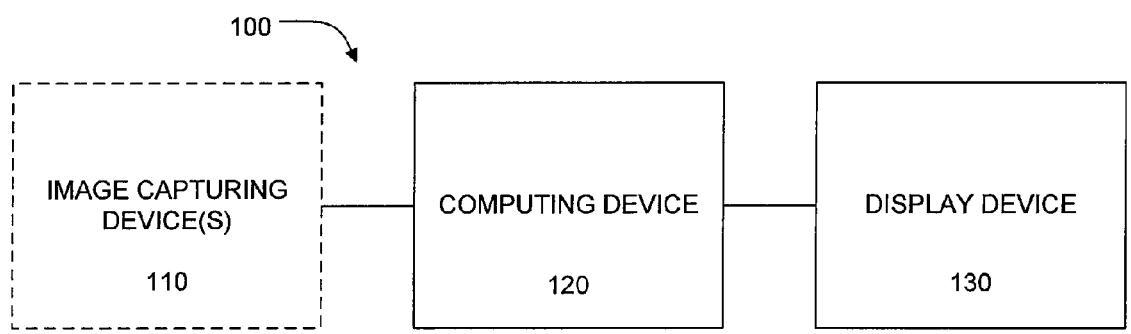
FIG. 1 is a block diagram illustrating a system arranged to generate an image simulating the reflective condition of an object in a lighting environment, according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, systems, and computer programs related to methods, computer programs, and systems for generating computer images to simulate the light-reflective condition of an object when situated in a given environment. Such techniques may be applied to represent either virtual or real-world objects in a particular lighting environment. The given lighting environment may correspond to either a real-world location (e.g., at a park or inside a room) or a virtual environment.

For example, point-based modeling of the object may be employed. As such, the reflective qualities of the object may be modeled as a bi-directional reflection distribution function to be applied to directional incidence light sources from the environment. Such directional incidence light sources may be determined by generating a spatial irradiance mapping of the environment and employing an importance (i.e., saliency) sampling technique on the various light sources evident from such mapping.

E.g., if the lighting environment corresponds to a real-world place, an image-based mapping (e.g., spherical panorama) of the spatial irradiance may be employed, and a preset number of the most important light sources in such mapping may be determined. The directions of these determined light sources are towards the center of the spherical panorama in order to obtain the directional incidence light sources.

Furthermore, if a real-world object is to be simulated, a bi-directional reflection distribution function may be efficiently calculated for the object based on an image-based technique. For instance, by selecting a series of camera shooting directions and primary light source positions, and capturing images at respective combinations of shooting direction and light source position, an ordinary digital camera could be used for obtaining the image data necessary for calculating an appropriate reflection distribution function.

FIG. 1 is a block diagram illustrating a system 100 arranged to generate an image simulating the reflective condition of an object in a lighting environment, according to an example embodiment. As shown in FIG. 1, the system 100 may include a computing device 120 and a display device 130 which is controlled by the computing device 120. The system 100 may optionally include one or more image capturing devices 110 capable of being communicatively connected to the computing device 120.

The image capturing device(s) 110 are illustrated by dotted lines to indicate it is an optional element of the system. Particularly, at least one image capturing device 110 may be used to capture images of the object to be rendered, in case an image-based technique is to be used to calculate a bi-directional reflection distribution function of the object. Similarly, if an image-based technique is to be used to generate a mapping of a real-world lighting environment, at least one image capturing device 110 may be used to capture images of that environment. Such image capturing device(s) 110 may be used to send image data of captured images (e.g., of the object and/or lighting environment) as input to the computing device 120.

The computing device 120 is capable of carrying out any of the processes and/or computations that are used for generating the image of the object in the given lighting environment. Examples of such processes and/or computations will be described in more detail below in connection with FIGS. 2A-2E. Furthermore, an example configuration of the computing device 120 will be described in more detail below in connection with FIG. 3. It should be noted that, while a single computing device 120 is illustrated in FIG. 1, this is not intended to be limiting. E.g., processes and computations for generating the image can be implemented in a distributed system made up of multiple computing devices 120.

Furthermore, even though the computing device 120, display device 130, and the image capturing device(s) 110 (optional) are illustrated as separate units in FIG. 1, this is not intended to be limiting. For instance, the display device 130 may either be implemented as a standalone device in one embodiment, or integrated in the same apparatus with the computing device 120 (e.g., in a notebook or laptop computer) and/or the image capturing device 110. A non-limiting example of a display device 130 implemented in an image capturing device 110 are liquid crystal displays on digital cameras.

In a similar fashion, an image capturing device 110 may be implemented as a separate hardware apparatus from the computing device 120 or, alternatively, can be integrated into the computer device 120. For example, various types of portable computing devices 120 (PDA's, smart cell phones, etc.) may contain an integrated digital camera. In addition, the image capturing devices 110 may have certain processing capabilities to perform some of the functions described below with respect to the computing device 120.

FIGS. 2A-2E are flow diagrams collectively illustrating an example of a method for generating an image simulating the reflective condition of an object in a lighting environment.

Figure 2B:
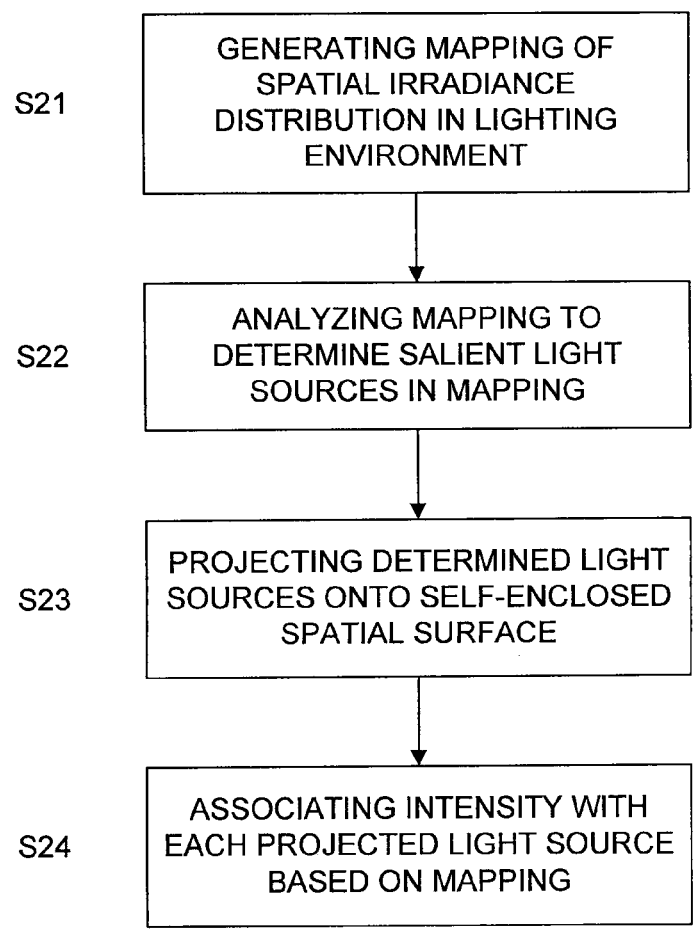

FIG. 2A illustrates a high level flow diagram of the aforementioned method. As shown in step S20, a determination is made as to the directional incidence light sources for the lighting environment. This step S20 also includes determining measures of intensity for the directional incidence light sources. This step may determine a preset number of the most important or salient directional incidence light sources in the lighting environment, based on an importance sampling technique. Detailed example embodiments as to how the directional incidence light sources of the lighting environment and their respective intensities might be determined will be described below in connection with FIGS. 2B and 2C.

Referring again to FIG. 2A, in step S40, the image of the object is generated by applying a bi-directional reflection distribution function on the intensities of directional incidence light sources of the lighting environment (as determined in step S20). The bi-directional reflection distribution function can generally be used to compute, for any position of an object surface, the ratio of reflected light energy exiting toward a given viewing direction to the irradiance incident on that surface position from a given direction.

The bi-directional reflection distribution function can be expressed in the form of a series of reflectance ratio functions $f_p(\theta_i, \phi_i, \theta_e, \phi_e)$ corresponding to a set of sampled points on the surface of the object, where p represents the coordinates of a particular point on the object's surface, $(\theta_i, \phi_i)$ represents the direction of a particular directional incidence light source i in the particular lighting environment, and $(\theta_e, \phi_e)$ represents the desired viewing direction. For a given point p, the corresponding function $f_p(\theta_i, \phi_i, \theta_e, \phi_e)$ returns a value proportional to the ratio $$\frac{I(\theta_e, \varphi_e)}{I(\theta_i, \varphi_i)},$$

where $I(\theta_e, \phi_e)$ is the intensity of light reflected toward the viewing direction, and $I(\theta_i, \phi_i)$ being the intensity of the directional incidence light source in the lighting environment.

There are various techniques known in the relevant art for calculating a bi-directional reflection distribution function, for both tangible real-world objects and/or virtual objects which are three-dimensionally modeled by a computer. Any of these known techniques may be employed in step S40. However, a detailed example embodiment for computing the bi-directional reflection distribution function of a real-world object, according to an image-based technique, shall be described below in connection with FIG. 2E.

As mentioned above, step S40 generates the image data (e.g., pixel values) based on the bi-directional reflection distribution function of the object surface, and the intensities of directional incidence light sources of the lighting environment (as determined in step S20). In step S40, the pixel value(s) corresponding to a particular point p on the object's surface may be determined according to the following equation:

$$L_p = \sum_{i=1}^{x} f_p(\theta_i, \varphi_i, \theta_e, \varphi_e) I(\theta_i, \varphi_i) \quad (\text{Eq. 1})$$

in which:
$L_p$ represents one or more pixel values in the generated image corresponding to point p,
the directional incidence light sources are indexed according to i=1 ... x (x being the number of directional light sources determined in step S20),
$f_p(\theta_i, \phi_i, \phi_e)$ represents the object reflectance ratio for point p on the object surface, and
$I(\theta_i, \phi_i)$ represents the intensity of the directional incidence light source i.

According to example implementations, the value $L_p$ may define either a grayscale value or a color value for the corresponding pixel(s), depending how the object reflectance ratio $f_p(\theta_i, \phi_i, \theta_e, \phi_e)$ is defined (this will be described in more detail below in connection with FIG. 2E).

Thus, based on the pixel values $L_p$ generated for respective points p on the surface of the object to be rendered according to the chosen viewing direction, an image can be generated which simulates the light-reflective qualities of the object in the particular lighting environment. Such an image can be outputted according to step S60. For example, such image can be displayed by the display device 130 connected to the computing device 120. As another option, the generated image can be saved in a storage medium (e.g., DVD-ROM, floppy disc, hard drive, or solid-state memory device) for future use.

FIG. 2B is a flow diagram illustrating an example process for implementing step S20 of FIG. 2A. It should be noted that the steps of FIG. 2B need not be performed strictly in the sequence illustrated.

Step S21 generates a mapping of the spatial distribution of irradiance (i.e., incoming light) in the lighting environment. In other words, this step produces a map of the irradiance that would surround an object when situated at a given point in the lighting environment.

Figure 2C:
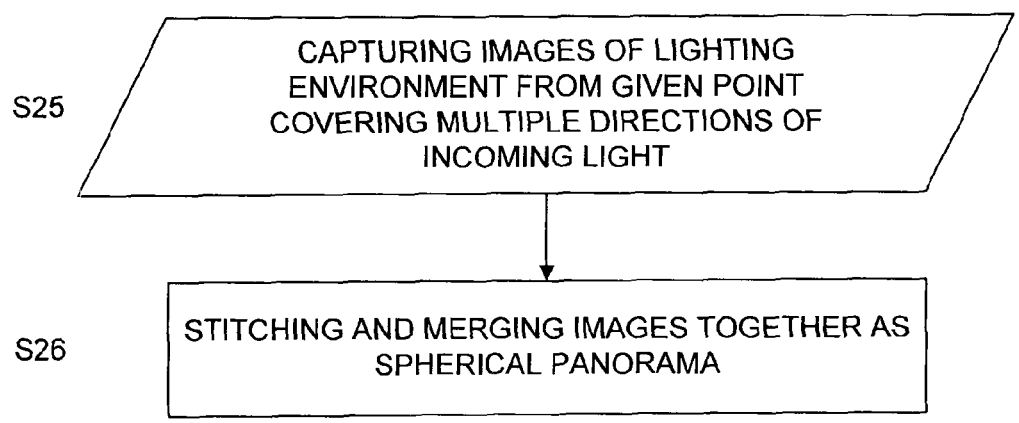

A real-world location might be selected as the lighting environment. If so, an image-based technique could be utilized in step S21 to generate the mapping. FIG. 2C is a flow diagram illustrating an example of an image-based technique for generating a mapping of spatial irradiance distribution when the lighting environment corresponds to a real-world location. According to this example, in step S25, an image capturing device 110 may be used to capture a series of images, from the given point, covering different directions of incoming light. In step S26, the captured images are stitched together and merged into a spherical panorama.

Figure 5A:
FIG. 5 illustrates examples of spherical panoramas generated for outdoors locations in the real world.
Figure 5B:
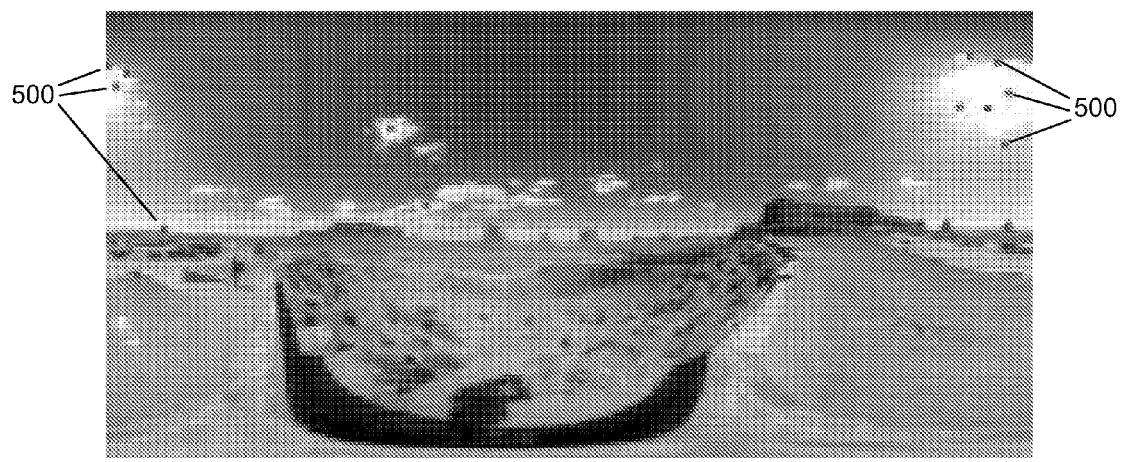

A spherical panorama maps the full field of view, 360 degrees horizontally and 180 degrees vertically, from a given point in the environment onto a planar surface. FIGS. 5A and 5B illustrate examples of spherical panoramas corresponding to different outdoors location (wooded area, desert) in the real world.

The steps illustrated in FIG. 2C may be implemented by any of known techniques for generating spherical panoramas. While some such techniques utilize special equipment (e.g., cameras with wide angle lenses), the use of such equipment is not required. For instance, a technique described by Weihua An et al. in "Hardware Accelerated Approach for Accurate Surface Splatting," Journal of Computational Information Systems (Workshop Proceedings of Edutainment 2006), pp. 567-574 (2006), the entire contents of which are herein incorporated by reference, may be used to obtain a spherical panorama of the environment using a normal digital camera.

Of course, the use of a spherical panorama as the environment irradiance mapping is not intended to be limiting. For example, the mapping may be illustrated as a cylindrical or cubic panorama.

Referring again to FIG. 2B, step S22 analyzes the mapping of spatial irradiance distribution (as determined in step S21), to determine important or salient light sources represented within the mapping. In an example embodiment, this analysis may be performed by an importance sampling algorithm designed to determine the positions of a preset number of the most important or salient light sources represented in the mapping.

Any of various types of importance sampling algorithms, which are known in the relevant technical art, may be used in step S22. For example, a version of wavelet importance sampling may be applied. A particular version of wavelet importance sampling, sometimes referred to a controllable wavelet importance sampling, is described by Petrik Clarberg et al. in "Wavelet Importance Sampling: Efficiently Evaluating Products," ACM Transactions on Graphics, Proceedings of SIGGRAPH'05, pp. 1166-1175 (2005), the entire contents of which are herein incorporated by reference. Also, a method of two-dimensional Poisson-Disk uniform sampling can be extended to the application of determining important light sources in the environment mapping in step S22. An example of an extension of two-dimensional Poisson-Disk uniform sampling which may be used is described by Y. Fu and B. Zhou in "Direct Sampling on Surface for High Quality Remeshing," Proceedings of the 2008 ACM Symposium on Solid and Physical Modeling (2006), the entire contents of which are herein incorporated by reference.

Referring to the examples of FIGS. 5A and 5B, these figures illustrate a series of sampling points 500 on the respective spherical panoramas determined to be salient light sources according to step S22. These sampling points 500 may be granulated to the size of a single pixel in the panorama, or any number of pixels as desired.

Of course, the above examples of importance sampling techniques are not intended to be limiting. Other known importance sampling algorithms may be used, as would be contemplated by persons of ordinary skill in the art.

Referring again to FIG. 2B, step S23 is used for projecting determined light sources in the mapping (as determined by step S22) onto a self-enclosed spatial surface surrounding a point of reference in the environment. For instance, if the mapping was created by stitching captured images into a spherical panorama, the determined light sources may be projected onto a spherical surface surrounding the point from which the images were captured. Alternatively, if a cylindrical or cubic panorama were generated as the mapping, the determined light sources may be projected onto a cylindrical or cubic surface, respectively.

In an example embodiment, step S23 may be used to project determined light sources from a spherical panorama to a spherical surface surrounding the point of reference. In this case, the position of a sampling point 500 in the spherical panorama for a determined light source represents the direction of the light source towards the center of the sphere.

Figure 6A:
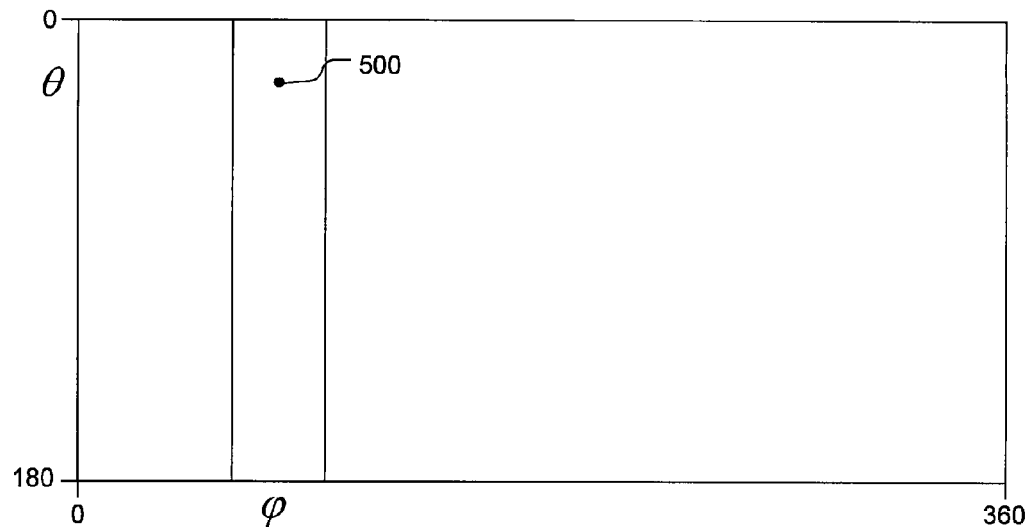
FIGS. 6A and 6B illustrate an example of spatial positional correspondence between a point in a spherical panorama and its projection onto a spherical surface.
Figure 6B:
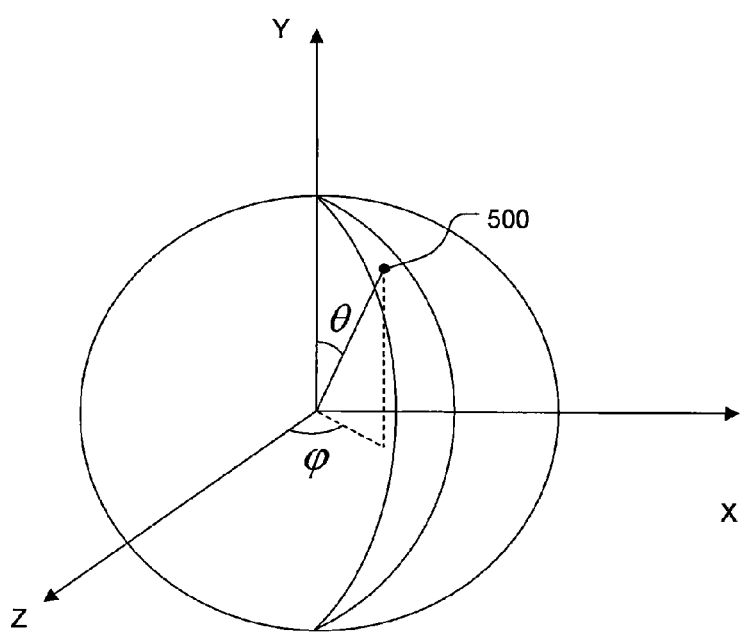

FIGS. 6A and 6B illustrate the spatial positional correspondence between the position of a sampling point 500 in the original spherical panorama and the result of projecting it onto a spherical surface Ω. Particularly, FIG. 6A illustrates the position of a sampling point 500 in a spherical panorama in terms of latitude and longitude (θ,ϕ), while FIG. 6B illustrates position and direction of the corresponding light source as projected onto the spherical surface Ω.

In projecting a particular sampling point 500 onto a spherical surface Ω, whose radius is R, its position on surface Ω (in terms of Cartesian coordinate system) may be computed using the following equations:

$$\begin{cases} X_p = R \sin\theta_p \sin\varphi_p \\ Y_p = R \cos\theta_p \\ Z_p = R \sin\theta_p \cos\varphi_p \end{cases} \quad \text{(Eq. 2)}$$

in which p identifies the particular sampling point 500 (or pixel) in the spherical panorama; $\theta_p$ and $\varphi_p$ are its latitude and longitude, respectively, in the spherical panorama; and ($X_p$, $Y_p$, $Z_p$) are the Cartesian coordinates of the point's position on the spherical surface Ω.

The result of projecting a determined light source from the environment mapping can provide information as to the direction of the incoming light source with respect to the point of reference. In the example discussed above, this would be the direction from the position ($X_p$, $Y_p$, $Z_p$) on the surface Ω toward the center of the sphere at (0, 0, 0). Thus, the projected light source may be considered a directional light source, which would be incident on the surface of any object if such object were placed at the point of reference in the environment, i.e., the center of the sphere in the example discussed above. Accordingly, the projected light sources may be referred to as "directional incidence light sources" for purposes of this disclosure.

Referring again to FIG. 2B, in step S24, an intensity value can also be associated with a respective one of the directional incidence light sources, such intensity value being determined based on the mapping. For example, if the mapping is generated as a panorama (spherical or other), the following technique could be used. First, a Voronoi decomposition of the panorama may be performed based on the sampling points 500 of the determined light sources. Voronoi decomposition is known technique for partitioning a metric space (e.g., a spherical panorama) into polygonal segments based on a set of discrete points (e.g., sampling points 500). When this decomposition is obtained, the Voronoi polygon for a particular sampling point 500 may be found, and the gray values of pixels inside such polygon may be integrated in order to obtain an intensity value associated with the corresponding directional incidence light source.

It should be noted that the order in which steps S23 and S24 of FIG. 2B is not important. For example, an intensity value may be calculated for a determined light source in the mapping before the light source is projected onto the self-enclosed surface according to step S23.

Figure 2D:
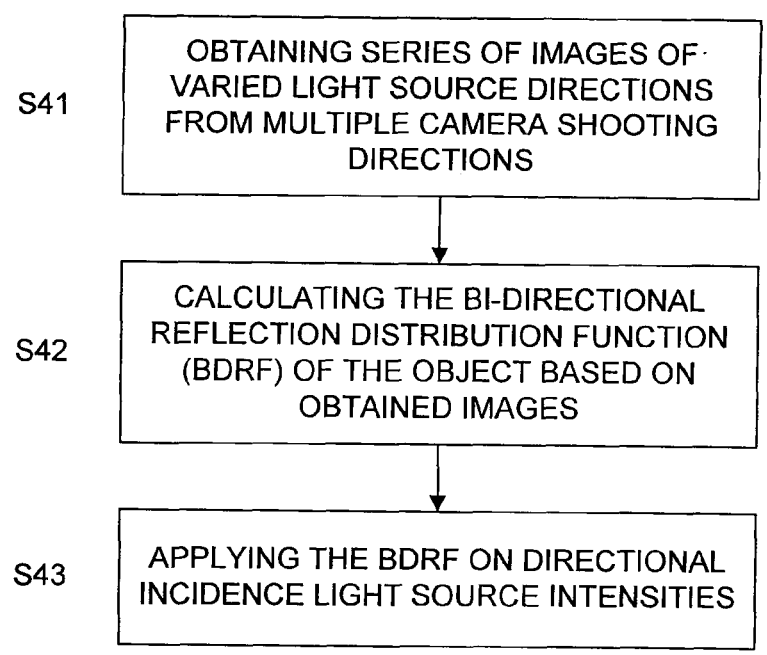

FIG. 2D is a flow diagram generally illustrating an example of a process for implementing step S40 of FIG. 2A. Particularly, the process illustrated in FIG. 2D corresponds to the utilization of an image-based technique to generate a bi-directional reflection distribution function of a real-world object.

In FIG. 2D, step S41 obtains a series of images of the object, in which the directions of the primary light source on the object is varied, from respective ones of multiple camera directions. Step S42 calculates a bi-directional reflection distribution function of the object on the basis of the images obtained by step S41. This bi-directional reflection distribution function is applied to the intensities of the directional incidence light sources according to step S43.

For example, the technique illustrated in FIG. 2D may involve selecting a series of camera shooting directions around the object, and also selecting a series of light source directions around the object. For a combination of a selected shooting direction and a selected light source direction, an image of the object may be captured by an image capturing device 110, e.g., common digital camera. For such image, the shooting direction and light source direction can be recorded as the sampled "viewing direction" and the sampled "incidence light direction," respectively.

Furthermore, sampling points can be obtained by selecting a number (m) of camera shooting positions and a number (n) of primary light source positions which are distributed around the object. Since the camera or image capturing device 110 is pointed toward the object at each selected camera shooting position, the m selected camera shooting positions correspond to m shooting directions (i.e., sampled viewing directions), respectively. Similarly, since the primary light source is pointed at each light source position to emit a light ray incident on the object surface, the n selected primary light source positions correspond to n light source directions (i.e., sampled incidence light directions). As such, if an image is to be captured for each combination of camera shooting direction and light source direction, a total of m×n images may be captured of the object.

Figure 4:
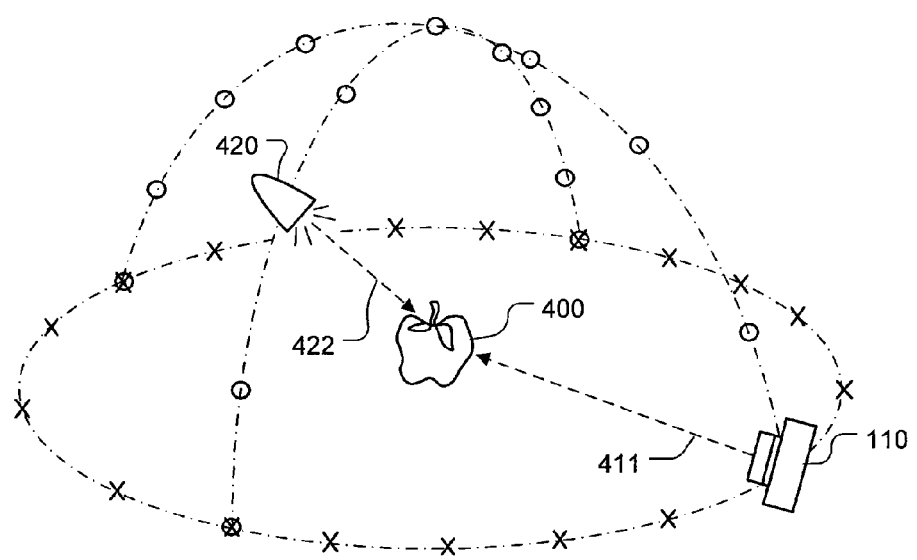
FIG. 4 is a diagram illustrating a distribution of camera shooting positions and light source positions for an image-based technique of sampling light-reflective properties of an object, according to an example embodiment.

For instance, FIG. 4 is a diagram illustrating an example distribution of camera shooting positions (illustrated as "×") and light source positions (illustrated as "○") for sampling light-reflective properties of an object 400 (an apple being illustrated as an example type of object in FIG. 4). As illustrated in FIG. 4, positioning the primary light source 420 at a particular one of the n primary light source positions provides a sampled incidence light direction 422. Similarly, positioning the image capturing device 110 at a particular one of the m camera shooting positions provides a sampled viewing direction 411.

In a particular example, 20 camera shooting positions may be selected (i.e., m=20), and 20 primary light source positions (i.e., n=20) for the object 400. This would correspond to 20 sampled viewing directions 411 and 20 sampled incidence light directions 422. If an image were to be captured of the object 400 for each combination of camera shooting position and primary light source position, this would result in obtaining 400 (20×20) images of the object 400.

Figure 2E:
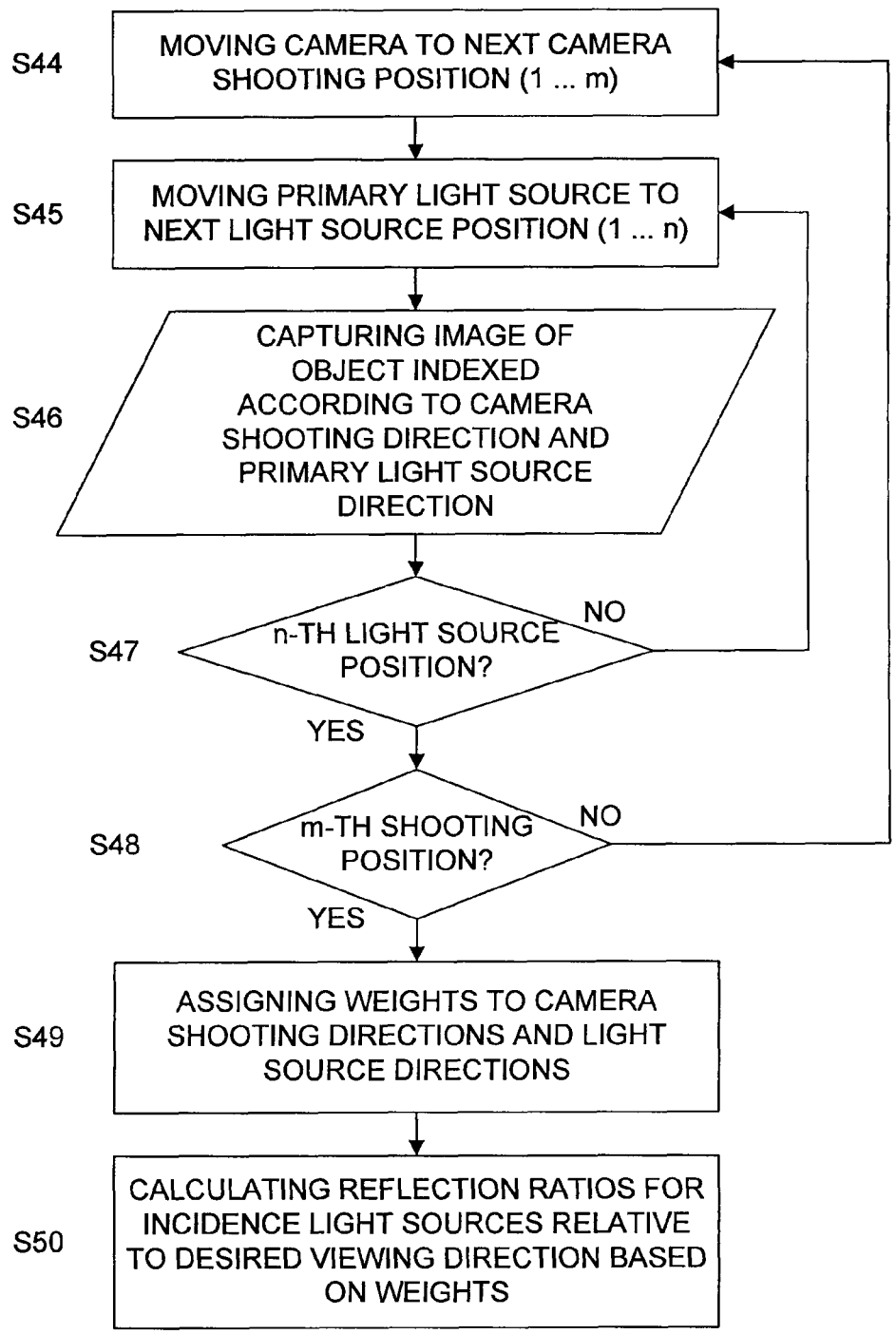

FIG. 2E illustrates a particular example for implementing the process of FIG. 2D. In FIG. 2E, step S44 indicates that the image capturing device 110 (e.g., camera) is moved to a particular one of the m camera shooting directions. According to step S45, the primary light source is moved to one of the n primary light source positions, directed toward the object. At this point, an image may be captured of the object by an image capturing device 110 according to step S46. In step S46, the camera shooting direction (i.e., sampled viewing direction) 411 and light source direction (i.e., sampled incidence light direction) 422 may additionally be recorded to index the captured image. After capturing and indexing the image, a determination is made in decision block S47 whether the current light source position is the last of the selected series of n primary light source positions, i.e., whether an image has been captured from the particular camera shooting direction for each of the n primary light source positions 422. If not, the process returns to step S45 to move the primary light source to another of the n primary light source positions to capture the next image. However, after the series of images for the n primary light source positions have been captured from the particular shooting direction, decision block S48 determines whether the current camera shooting position is the last of the selected series of m camera shooting positions, i.e., whether a series of images have been captured from each of the m camera shooting directions 411. If not, the process returns to step S44 to move the camera to the next camera shooting position.

Although FIG. 2E illustrates an example embodiment where the position of the primary light source is varied while images are captured from a particular shooting position, this is not intended to be limiting. As an alternative, the camera shooting directions may be changed while the primary light source is fixed at a particular light source position in order to obtain a series of images. Any sequence may be implemented for changing the camera shooting directions and primary light source positions in order to capture an image for the desired combinations of camera shooting direction (sampled viewing direction) 411 and light source direction (sampled incidence light direction) 422.

Also, while the example embodiment of FIG. 2E captures an image for each combination of camera shooting direction and primary light source position, this is also not intended to be limiting. It is not absolutely necessary to capture from each combination of selected camera shooting direction and primary light source position. It is contemplated that less than m×n images may be used to generate the bi-directional reflection distribution function.

Referring again to FIG. 2E, after the images have been captured and indexed, processing proceeds to step S49 to assign weights to the captured images according to the corresponding camera shooting directions (sampled viewing direction) 411 and light source directions (sampled incidence light direction) 422. These weights can be used to quantitate how much influence each captured image has in simulating the light-reflective condition of the object 400 in the lighting environment.

For instance, in step S49, a weight may be assigned to a sampled viewing direction 411 as a function of its proximity to the viewing direction in which the object 400 will be rendered in the image to be generated. Such a weight may be represented as $\omega(\theta_e,\phi_e,\theta_s,\phi_s)$, where $(\theta_s,\phi_s)$ represents the sampled viewing direction 411 corresponding to the s-th camera shooting position, and $(\theta_e,\phi_e)$ represents the desired viewing direction in which the object 400 is to be rendered in the generated image. According to an example embodiment, such a weight $\omega(\theta_e,\phi_e,\theta_s,\phi_s)$ may be calculated based on the cosine value of the spatial angle between the sampled viewing direction $(\theta_s,\phi_s)$ 411 and the desired viewing direction $(\theta_e,\phi_e)$.

In step S49, weights may be assigned to a sampled incidence light direction 422 as a function of its proximity to the directional incidence light sources in the lighting environment. Such a weight may be represented as $\omega(\theta_i,\phi_i,\theta_t,\phi_t)$, where $(\theta_t,\phi_t)$ is the sampled incidence light direction 422 corresponding to the t-th primary light source position, and $(\theta_i,\phi_i)$ is the direction of the i-th directional incidence light source in the lighting environment to be used in generating the bi-directional reflection distribution function. For instance, such a weight $\omega(\theta_i,\phi_i,\theta_t,\phi_t)$ may be calculated based on the spatial angle between the sampled incidence light direction $(\theta_t,\phi_t)$ 422 and the direction $(\theta_i,\phi_i)$ of the i-th directional incidence light source.

Referring again to FIG. 2E, step S50 is for calculating the object reflection ratios $f_p(\theta_i,\phi_i,\theta_e,\phi_e)$ to be used for calculating pixel values in the image being generated, which correspond to points p on the surface of the object 400. For example, such object reflectance ratios $f_p(\theta_i,\phi_i,\theta_e,\phi_e)$ can be calculated according to the following equation:

$$f_p(\theta_i, \varphi_i, \theta_e, \varphi_e) = \sum_{s=1}^{n} \omega(\theta_e, \varphi_e, \theta_s, \varphi_s) \sum_{t=1}^{m} \omega(\theta_i, \varphi_i, \theta_t, \varphi_t) f_p(s, t) \quad \text{(Eq. 3)}$$

in which:
$f_p(\theta_i,\phi_i,\theta_e,\phi_e)$ represents the object reflectance ratio at which an intensity of the i-th directional incidence light source in the lighting environment is reflected toward the desired viewing direction $(\theta_e,\phi_e)$ at point p of the object's surface, $(\theta_i,\phi_i)$ represents the direction of the i-th directional incidence light source, s represents one of the n selected camera shooting positions, $(\theta_s,\phi_s)$ represents the sampled camera shooting direction 411 which corresponds to the s-th camera shooting position, $\omega(\theta_e,\phi_e,\theta_s,\phi_s)$ represents a weight assigned to the sampled camera shooting direction $(\theta_s,\phi_s)$ 411, t represents one of the m selected primary light source positions, $(\theta_t,\phi_t)$ represents the sampled incidence light direction 422 corresponding to the t-th primary light source position, $\omega(\theta_i,\phi_i,\theta_t,\phi_t)$ is the weight assigned to the sampled incidence light direction $(\theta_t,\phi_t)$ 422, and $f_p(s,t)$ is a pixel value (color or grayscale) of pixel(s) corresponding to point p of the object surface in the image captured when the camera is positioned according to the selected camera shooting position s and the primary light source is positioned at the selected primary light source position t.

Accordingly, object reflectance ratios $f_p(\theta_i,\phi_i,\theta_e,\phi_e)$ may be obtained for the bi-directional reflection distribution function of the object 400 in the lighting environment, based on the image-based technique described in FIG. 2E.

It should be noted that the above equation may be used to generate either a color image or grayscale image of the object 400 situated in the lighting environment at a given point of reference. For instance, if a color image is to be generated, the value $f_p(s,t)$ may represent a color value for the pixel(s) corresponding to point p. On the other hand, if a grayscale image is desired, $f_p(s,t)$ may correspond to grayscale values.

Figure 3:
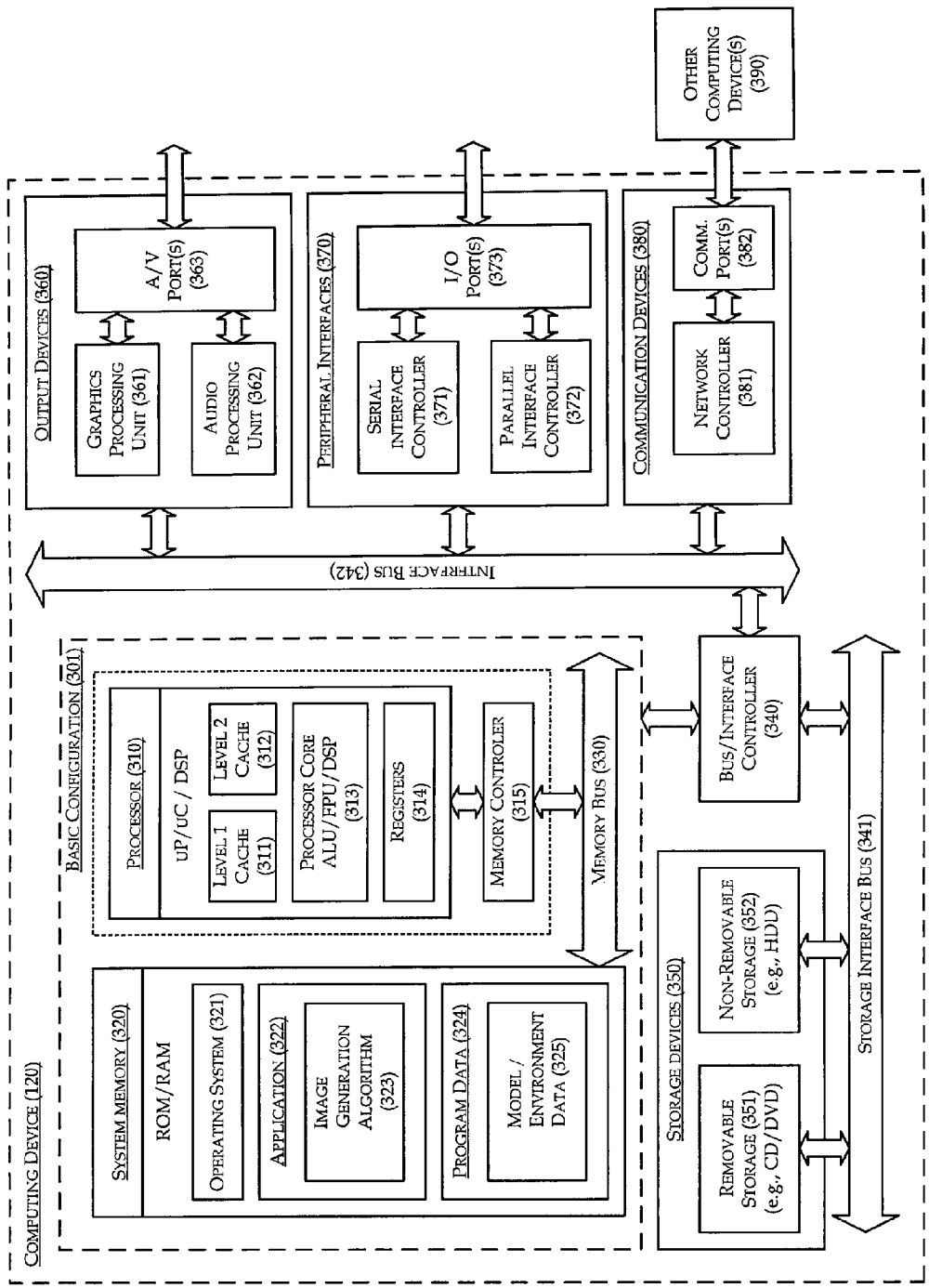
FIG. 3 is a block diagram illustrating an example of a configuration of a computing device arranged to generate an image simulating the reflective condition of an object in a lighting environment, according to an example embodiment.

FIG. 3 is a block diagram illustrating an example computing device 120 that is arranged for generating a computer image simulating the light-reflective condition of an object when situated in a particular lighting environment, according to above-described principles. In a very basic configuration 301, computing device 120 typically includes one or more processors 310 and system memory 320. A memory bus 330 can be used for communicating between the processor 310 and the system memory 320.

Depending on the desired configuration, processor 310 can be of any type including but not limited to a microprocessor (µP), a microcontroller (µC), a digital signal processor (DSP), or any combination thereof. Processor 310 can include one more levels of caching, such as a level one cache 311 and a level two cache 312, a processor core 313, and registers 314. The processor core 313 can include an arithmetic logic unit (ALU), a floating point unit (FPU), a digital signal processing core (DSP Core), or any combination thereof. A memory controller 315 can also be used with the processor 310, or in some implementations the memory controller 315 can be an internal part of the processor 310.

Depending on the desired configuration, the system memory 320 can be of any type including but not limited to volatile memory (such as RAM), non-volatile memory (such as ROM, flash memory, etc.) or any combination thereof. System memory 320 typically includes an operating system 321, one or more applications 322, and program data 324. Application 322 may include an image generation algorithm 323 which performs one or more of the processes (or any part thereof) described above in connection with FIGS. 2A-2D for generating a computer image simulating the object in the lighting environment. Program data 324 may include object and/or environment data 325 such as data of a virtual object (e.g., three-dimensional computer model) and/or a virtual lighting environment, or previously obtained image data of a real-world object 400 or lighting environment. This described basic configuration is illustrated in FIG. 3 by those components within dashed line 301.

Referring again to FIG. 3, computing device 120 can have additional features or functionality, and additional interfaces to facilitate communications between the basic configuration 301 and any required devices and interfaces. For example, a bus/interface controller 340 can be used to facilitate communications between the basic configuration 301 and one or more data storage devices 350 via a storage interface bus 341. The data storage devices 350 can be removable storage devices 351, non-removable storage devices 352, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 320, removable storage 351 and non-removable storage 352 are all examples of computer storage media. Computer storage media include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 120. Any such computer storage media can be part of device 120.

Computing device 120 can also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 which may be configured to communicate with the display device 130, and an audio processing unit 362 which may be configured to communicate to speakers, via one or more A/V ports 363. Example peripheral interfaces 370 include a serial interface controller 371 or a parallel interface controller 372, which can be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which can be arranged to facilitate communications with one or more other computing devices 390 over a network communication via one or more communication ports 382. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 120 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 120 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   determining a directional incidence light source, with respect to a given point of a lighting environment, that is associated with a respective intensity, the determining comprises:
   generating a mapping of spatial irradiance distribution surrounding a given point of a lighting environment,
   stitching the mapping into a spherical panorama from a series of images of the lighting environment in a plurality of shooting directions from the given point, determining a salient light source represented in the mapping by executing an importance sampling algorithm, and projecting the determined salient light source from the spherical panorama onto a self-enclosed spherical spatial surface surrounding the given point in the lighting environment to determine the directional incidence light source on the self-enclosed spatial surface, wherein the directional incident light source's direction is towards the given point, and the lighting environment represents an area surrounding a real-world location;

utilizing at least one gray value associated with the determined salient light source in the mapping to obtain the respective intensity for the incidence directional light source;

generating an image of an object situated at the given point in the lighting environment from a viewing direction by applying a bi-directional reflection distribution function of the object on the respective intensity of the directional incidence light source; and outputting the generated image.

2. The method of claim 1, wherein the determining the salient light source includes performing a wavelet importance sampling.

3. The method of claim 1, wherein the determining the salient light source includes performing a Poisson-disk importance sampling.

4. The method of claim 1, wherein the projecting comprises:

converting a position in the mapping of the determined salient light source into a coordinate on the self-enclosed spherical spatial surface for a corresponding directional incidence light source.

5. The method of claim 1, further comprising:

obtaining a series of images of the object from a respective one of a plurality of camera shooting directions, wherein a direction of a primary light source on the object is varied in the series of images; and generating the bi-directional reflection distribution function of the object based on the series of images of the object.

6. The method of claim 5, wherein the obtaining comprises:

selecting a plurality of light source positions and the plurality of camera shooting positions around the object;

capturing a first image of the object at a selected shooting position of the plurality of camera shooting positions, the selected shooting position corresponding to a camera shooting direction; and capturing a second image of the object at a selected light source position of the plurality of light source positions, the selected light source position corresponding to a primary light source direction, wherein the first and second images of the object are captured for combinations of the camera shooting direction and the primary light source direction.

7. The method of claim 6, wherein the generating the bi-directional reflection distribution function includes:

assigning a weight to the primary light source direction based on a proximity to at least one of directional incidence light sources;

assigning a weight to the camera shooting direction based on a proximity to the viewing direction with respect to the object;

weighting pixel values of a captured image using the weight assigned to the primary light source direction and the weight assigned to the camera shooting direction; and calculating object reflectance ratios for at least some of the directional incidence light sources relative to the viewing direction, the object reflectance ratios being calculated based on the weighted pixel values.

8. The method of claim 1, wherein the bi-directional reflection distribution function of the object is calculated by:

obtaining a series of images of an object from a plurality of camera shooting directions, wherein a direction of a primary light source on the object is varied in the series of images, and wherein the obtaining comprises:

selecting a plurality of light source positions and a plurality of camera shooting positions around the object, capturing images of the object while the camera is positioned at a selected camera shooting position in a direction of the object, wherein the selected camera shooting position corresponds to a camera shooting direction of the plurality of camera shooting positions, and capturing images of the object while the primary light source is positioned at a selected light source position of the plurality of light source positions in the direction toward the object, wherein the selected light source position corresponds to a primary light source direction and the images of the object are indexed based on the selected camera shooting position and the selected light source position of the plurality of light source positions, wherein an image of the object is captured for respective combinations of the plurality of camera shooting directions and the primary light source direction.

9. The method of claim 8, wherein the bi-directional reflection distribution function is calculated by:

assigning a weight to an incidence light direction based on a proximity to the viewing direction with respect to the object;

assigning a weight to the camera shooting direction based on the proximity to the viewing direction with respect to the object;

weighting pixel values of a captured image using the weights assigned to the primary light source direction and the camera shooting direction; and calculating object reflectance ratios for at least some of the directional incidence light sources relative to the viewing direction, the object reflectance ratios being calculated based on the weighted pixel values.

10. The method of claim 1, wherein at least one light source position of a plurality of light source positions corresponds to a camera shooting position of a plurality of camera shooting positions.

11. An apparatus, comprising:

a computer processor programmed to:

determine a directional incidence light source with respect to a given point of a lighting environment, the directional incidence light source associated with a respective intensity, and generate an image representing an object situated at the given point in the lighting environment from a viewing direction by applying a bi-directional reflection distribution function of the object on the respective intensity of the directional incidence light source; and a device configured to output the generated image, wherein the computer processor determines the directional incidence light source by:

generating a mapping of spatial irradiance distribution surrounding the given point of the lighting environment, stitching the mapping into a spherical panorama from a series of images of the lighting environment in a plurality of shooting directions from the given point, determining a preset number of salient light sources represented in the mapping based on saliency values associated with salient light sources by executing an importance sampling algorithm, projecting the determined salient light sources from the spherical panorama onto a self-enclosed spherical spatial surface surrounding the given point in the lighting environment to obtain directional incidence light sources on the surface, based on the mapping, wherein the directional incident light sources' directions are towards the given point, and the lighting environment represents an area surrounding a real-world location, and utilizing at least one gray value associated with the determined salient light sources in the mapping to obtain respective intensities for the incidence directional light sources.

12. The apparatus of claim 11, wherein the preset number of salient light sources in the mapping are determined by performing a version of wavelet importance sampling.

13. The apparatus of claim 11, wherein the preset number of salient light sources in the mapping are determined by performing a Poisson-disk importance sampling.

14. The apparatus of claim 11, wherein the projecting comprises: converting a position in the mapping of a determined salient light source into a coordinate on the self-enclosed spherical spatial surface for the corresponding directional incidence light source.

15. The apparatus of claim 11, the computer processor is further programmed to perform the following:

obtain a series of images of the object captured by a camera from a respective one of a plurality of camera shooting directions, wherein the direction of a primary light source on the object is varied in the series of, the bi-directional reflection distribution function of the object being generated based on the obtained images of the object.

16. The apparatus of claim 15, the computer processor is further programmed to calculate the bi-directional reflection distribution function by:

assigning a weight to an incidence light direction based on a proximity to the viewing direction with respect to the object;

assigning a weight to the respective one of the plurality of camera shooting directions based on the proximity to the viewing direction with respect to the object;

weighting pixel values of a captured image using the weights assigned to the primary light source direction and the respective one of the plurality of camera shooting directions; and calculating object reflectance ratios for at least some of the directional incidence light sources relative to the viewing direction, the object reflectance ratios being calculated based on the weighted pixel values.

* * * * *

UNITED STATES PATENT AND TRADEMARK OFFICE
CERTIFICATE OF CORRECTION

PATENT NO.         : 8,803,880 B2
APPLICATION NO.    : 12/545420
DATED              : August 12, 2014
INVENTOR(S)        : Zhou et al.

It is certified that error appears in the above-identified patent and that said Letters Patent is hereby corrected as shown below:

In the Specification

In Column 2, Line 11, delete "farther" and insert -- further --, therefor.

In Column 5, Line 26, delete "$f_p(\theta_i, \phi_i, \phi_e)$" and insert -- $f_p(\theta_i, \varphi_i, \theta_e, \varphi_e)$ --, therefor.

Signed and Sealed this
Sixth Day of January, 2015

Michelle K. Lee
*Deputy Director of the United States Patent and Trademark Office*